Jan. 5, 1954   W. F. BORGERD   2,664,715
CONTROL VALVE FOR SPRAY SYSTEMS
Filed Dec. 29, 1950   2 Sheets-Sheet 1

Inventor:
William F. Borgerd
Paul O. Pippel
Atty.

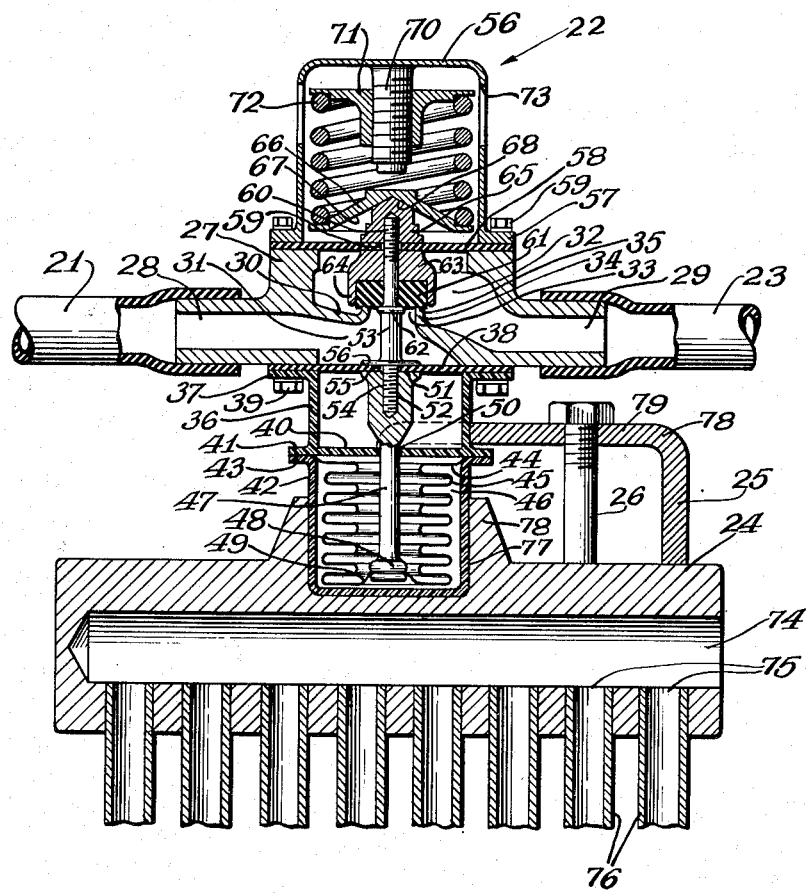

Patented Jan. 5, 1954

2,664,715

UNITED STATES PATENT OFFICE 2,664,715

CONTROL VALVE FOR SPRAY SYSTEMS

William F. Borgerd, Evansville, Ind., assignor to International Harvester Company, a corporation of New Jersey Application December 29, 1950, Serial No. 203,450

4 Claims. (Cl. 62—3)

This invention relates generally to a control valve for a spray system and more particularly to a thermostatically controlled valve for controlling the spraying of water over the exterior surfaces of an air-cooled condenser or the feeding of water to a water-cooled condenser of a hermetic refrigeration system.

Refrigeration systems having air-cooled condensers are at times equipped with water spray systems, whereby water mist is sprayed over the exterior surfaces of the condenser when either the condenser or the housing of the motor compressor reaches objectionably high temperatures. The quantity of water required is very small since the water is vaporized by absorbing heat from the hot metal. The air passing through the condenser will normally cool the condenser, but occasionally the condenser will become overheated during overload periods such as encountered during hot summer months. The water spray system acts as a capacity booster and prevents overheating during such overload periods.

The water spray system is usually provided with a valve for controlling the operation of the water spray. Heretofore the valves have been actuated by high side pressures but the necessity of connecting into the refrigeration system causes them to be unsatisfactory for a hermetic refrigeration system, since service replacements would involve opening up the refrigeration system with all the hazards that such field operations involve. Adding a power element to such a valve in order to make it responsive to temperature rather than pressure is not a solution since the power element bulb would normally be at a higher temperature than the valve body. This will cause the volatile charge in the power element to condense to a liquid in the valve end of the power element. Control and operation of the power element will then come from the temperature of the water valve rather than from the power element bulb. The valve, as a result, will shut off the water supply even though the compressor is too hot.

The principal object of the invention is to provide a cooling system with a control valve which overcomes the above mentioned disadvantages.

Another object of the invention is to provide a cooling system with a control valve which is accurately responsive to the temperature of the high side of a refrigeration system.

A further object of the invention is to provide a refrigeration system with a cooling system having a control valve mounted in heat exchange relationship with a high side member.

A further object is to provide a cooling system with a control valve which may be easily assembled to a portion of a refrigeration system and may be easily reached for servicing.

A further object is to provide a refrigeration system with a control valve for a cooling system adapted to be opened by a thermostat upon an increase in high side temperature and to be closed by mechanical means upon a decrease in high side temperature.

A further object is to provide an efficient and economical mechanism for controlling the cooling system of a refrigeration system.

These and other objects are effected by the invention as will be apparent from the following description, reference being had to the accompanying drawings, wherein a preferred form of the present invention is clearly shown.

In the drawings:

Fig. 3 is a central sectional view of the valve and a portion of the condenser.

Figure 1:
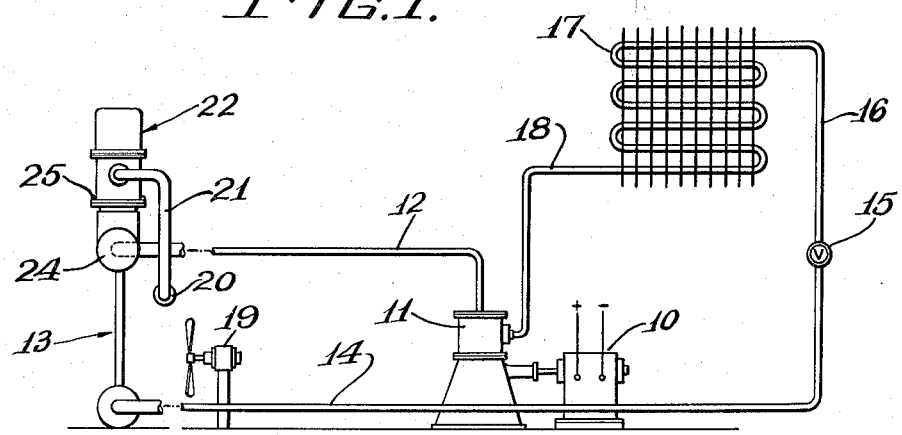
Fig. 1 is a diagrammatic view of a refrigeration system and water spray system in which the invention is incorporated.
Figure 2:
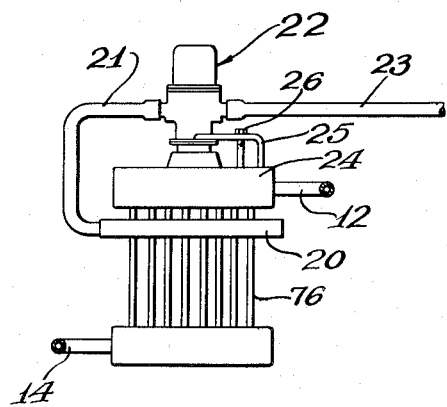
Fig. 2 is an elevational view of the condenser and water spray system.

Referring to Fig. 1 of the drawing, a refrigeration system is diagrammatically illustrated in which the present invention is incorporated. An electric motor 10 drives a refrigerant compressor 11 which compresses the refrigerant and discharges it through conduit 12 to condenser 13. The refrigerant is condensed in the condenser, then flows through conduit 14 to expansion valve 15, through conduit 16 to evaporator 17. In flowing through evaporator 17, the refrigerant is vaporized and then pulled back through conduit 18 into compressor 11 to complete the usual refrigeration cycle. Those members which are subject to the high side temperature and pressure of the system are compressor 11, conduit 12, condenser 13, and conduit 14. Conduit 16, evaporator 17 and conduit 18 make up the low side of the system. The refrigerant expands in expansion valve 15 in the usual manner as it changes from the high side pressure to the low side pressure.

The evaporator 17 is positioned in an enclosure which is to be cooled and air from the enclosure is circulated into contact with the evaporator. Air from outside the enclosure is forced over the condenser by fan 19. This air will normally cool the condenser to the required temperature, but to insure proper cooling of the condenser during overload conditions, a water nozzle 20 is positioned adjacent the condenser for spraying water thereover. This water is sprayed in the form of a mist by nozzle 20 and will be vaporized as it contacts the hot surfaces of the condenser, thus absorbing considerable heat therefrom and lowering the temperature of the condenser. Water is conveyed to nozzle 20 from a suitable source through conduit 21, control valve 22 and conduit 23. The control valve 22 is secured to condenser header 24 by clamp member 25 and bolt 26 and will operate to control the water flow through nozzle 20 as hereinafter described.

The control valve is provided with a body 27 having a water inlet passageway 28 and a water outlet passageway 29. A wall member 30 divides the body into an inlet chamber 31 and outlet chamber 32. A valve port 33 extends through the wall 30 and an upwardly extending annular shoulder 34 provides a valve seat 35. Positioned below body 27 is a tubular shaped spacer 36 having an out-turned flange 37 formed around its upper edge. The outer edge of a circular shaped flexible diaphragm 38 is positioned between out-turned flange 37 and body 27, and bolts 39 extend through flange 37 and diaphragm 38 and are threaded into body 27. The bolts 39 secure the spacer 36 and diaphragm 38 in sealed relationship to body 27 so that diaphragm 38 prevents water from draining from inlet chamber 31. The lower end of spacer 36 is closed by wall member 40 and an out-turned shoulder 41 is formed on the lower edge of the spacer. The spacer 36 is constructed from a material having low heat conductivity, such as plastic or any other suitable material.

A cup-shaped housing member 42 having an out-turned flange 43 is positioned below spacer member 36 with the flange 43 adjacent the shoulder 41. The upper edge 44 of a metallic bellows member 45 is positioned between flange 43 and shoulder 41 and solder or other suitable sealing material secures together the shoulder 41, edge 44 and flange 43. The upper edge 44 of bellows member 45 is hermetically sealed to housing member 42 by the sealing material, and a closed expansible pressure chamber 46 is formed between bellows 45 and housing member 42 which is filled with any suitable expansible-contractible fluid. A cylindrical shaped valve lifter 47 has one end 48 secured in sealed relationship to the movable end 49 of bellows 45. The valve lifter 47 extends through an aperture 50 provided in wall member 40. The aperture 50 is only slightly larger in diameter than the valve lifter 47 which allows a smooth slidable fit therebetween. The purpose of wall member 40 is to prevent convectional air currents from flowing into contact with bellows 45. The upper end 51 of valve lifter 47 contacts the central portion of flexible diaphragm and is provided with an internally threaded recess 52.

A longitudinally extending valve stem 53 extends through valve port 33 and is provided with a lower externally threaded end 54 which extends through a hole 55 provided in diaphragm 38 and is fixedly received in recess 52 of valve lifter 47. The valve stem 53 is provided with an annular shoulder 56 which clamps around the hole 55 in diaphragm 38 and prevents water from running therethrough.

Above body 27 is positioned an inverted cup-shaped housing member 56 having an out-turned flange 57 formed on the lower edge thereof. The outer edge of a circular shaped flexible diaphragm 58 is positioned between flange 57 and body 27 and bolts 59 extend through flange 57 and diaphragm 58 and secure the housing member 56 to body 27. The diaphragm 58 has a hole 59 therethrough, through which the upper threaded end 60 of valve stem extends. A circular shaped valve member 61 rests on annular shoulder 62 of valve stem 53. Above valve member 61 is a retainer member 63 having a downwardly projecting annular shoulder 64 which fits around the valve member 61. The upper end of retainer member 63 contacts diaphragm 58 and an internally threaded cap member 65 engages the threaded upper end 60 of the valve stem. The cap member 65 is tightened downwardly in order to hold valve member 61 against shoulder 62 and to seal around the hole 59 in diaphragm 58. The diaphragm 58 will prevent water from flowing from outlet chamber 32 into cup-shaped member 56. The valve member 61 overlaps the up-turned flange 34 of valve port 33 and is adapted to be moved into and out of engagement with the valve seat 35.

Positioned above cap member 65 is a circular shaped plate member 66 having a generally concave center portion 67 which fits over the conically shaped end 68 of cap member 65. Secured to the top wall of housing member 56 is an externally threaded plug 70 on which an adjusting nut 71 is secured. A compressible coiled spring 72 fits between plate member 66 and adjusting nut 71. Spaced apart openings 73 are provided in housing member 56 through which access is provided to adjusting nut 71. The coiled spring 72 forces the valve stem downwardly until the valve member 61 is contacting valve seat 35 which closes valve portion 33. As the temperature of the fluid in pressure chamber 46 increases, the fluid will expand and cause the movable end 49 of bellows 45 to move upwardly. This will impart an upward movement to valve lifter 47 which will in turn move the valve stem 53 upward. The valve stem 53 will carry the valve member 61 upward until it is out of engagement with valve seat 35 so that the valve port 33 is open and water may flow from inlet chamber 31 to outlet chamber 32. As the temperature of the fluid in pressure chamber 46 decreases, the fluid will contract and spring 72 will force the valve member 61 against valve seat 35. By changing the setting of adjusting nut 71, the force exerted by spring 72 can be varied which will change the temperature which the fluid in pressure chamber must reach before the valve port 33 will be opened.

Condenser header 24 is provided with a cylindrical shaped chamber 74 into which conduit 12 extends. Openings 75 connect the chamber 74 with the condenser tubes 76. A circular shaped well 77 is provided in the condenser header 24 and an upstanding annular shoulder 78 surrounds the well. The cup shaped housing member 42 of control valve 22 fits into well 77, and clamp member 78 and bolt 79 secure the valve to the condenser header. By this arrangement, the pressure chamber 46 of the valve is in good heat exchange relationship with the condenser. Since the hot refrigerant gases flow from compressor 11 through conduit 12 into chamber 74 of the condenser header, any change in temperature of the refrigerant gases will immediately affect the temperature of the fluid in the pressure chamber 46 of the valve 22.

The operation of the water system will now be explained. When the refrigeration system is operating under normal conditions, the valve port 33 of valve 22 will be closed and the condenser will be properly cooled by the air circulated by fan 19. When overload conditions are encountered, the pressure and temperature in the high side members of the refrigeration system will be raised. The heat from the hot refrigerant will be conducted through the condenser header 24 to pressure chamber 46 with a resultant rise in the temperature and pressure of the fluid in the pressure chamber. This forces the valve member 61 away from the valve seat and water will flow through the valve 22 to nozzle 20. The water spraying from nozzle 20 onto the condenser 13 will be vaporized by absorbing heat from the condenser which will cause the condenser to be cooled quickly to a normal temperature. As the temperature of the condenser is lowered, the temperature and pressure of the fluid in pressure chamber 46 will also be lowered and coiled spring 72 will force the valve member 61 into engagement with valve seat 35. As the valve port 33 is closed, the water supply to nozzle 20 will be stopped and the condenser 13 will be cooled only by fan 19. Since the pressure chamber 46 is insulated from body 27 of the valve 22 by spacer member 36, there will be no danger of the temperature of the pressure chamber 46 being affected by the temperature of the water flowing through the body. If the valve is subject to freezing temperatures, it will not be damaged. The portions of body 27 around water inlet 28 and water outlet 29 are thick enough so that freezing cannot stretch or injure the body. The flexible diaphragms 38 and 58 will allow the expansion of ice in inlet chamber 31 and outlet chamber 32 without damage to the body or valve parts.

In the illustrated embodiment the valve 22 is described as being attached to a condenser header. It is to be understood that the valve could be secured to any other part of the high side of the refrigeration system that responds quickly to changes of high side pressure and temperature. For example, the valve could be mounted in heat exchange relation with some part of the compressor 11, or with the conduit 12 which connects the compressor and the condenser. With the valve 22 secured to some other part of the high side, the pressure and temperature of the fluid in pressure chamber 46 will be affected by changes of the pressure and temperature of the high side, and the water spray system will be controlled by the valve as explained above to properly cool the condenser.

From the foregoing it will be apparent that a water spray system is provided which is accurately controlled by a thermostatically operated valve in response to an increase in the temperature and pressure of the high side of a refrigeration system. The valve may be secured to some part of the high side which permits ease of assembly and allows easy access thereto in case servicing is required. The thermostatic element of the valve is quickly responsive to any change in high side temperature so that water will be promptly sprayed over the condenser when an overload condition is encountered which prevents damage to the refrigeration system. The valve may be placed in an unheated place since it will not be damaged by freezing temperatures. By providing a refrigeration system with a water spray system, a smaller condenser may be utilized since the water spray system will properly cool the condenser during overload conditions.

Although only one form of the invention has been disclosed, modifications thereof may become apparent to those skilled in the art, and consequently this invention is to be limited only by the scope of the appended claims and the prior art.

What is claimed is:

1. In combination, a refrigeration system having a condenser as one member of the high side, means for supplying a cooling liquid to said condenser, a valve for controlling the operation of said means, said valve comprising a valve body having an inlet chamber and outlet chamber connected by a valve port, a valve member adapted to open and close said valve port, a tubular spacer member having low heat conductivity properties secured to said body, a wall member closing one end of said spacer member, a housing secured to said spacer member, whereby said housing is thermally separated from said valve a thermostatic power element in said housing, and means for connecting said valve member and said power element, said valve positioned with said housing in heat exchange relationship with a portion of said high side, said power element moving said valve member to open position when said portion reaches a predetermined temperature.

2. In combination, a refrigeration system having a condenser as one member of the high side, means for spraying a cooling liquid over said condenser, a valve for controlling the operation of said means, said valve comprising a valve body having an inlet chamber and outlet chamber connected by a valve port, a valve stem which extends through said valve port, a valve member attached to said valve stem which is adapted to open and close said valve port, adjustable means which contacts one end of said valve stem and biases it toward valve closing position, and a thermostatic power element secured to the other end of said valve stem, said power element being insulated from the valve body by a spacer member, said valve being positioned with said power element in heat exchange relationship with a portion of said high side so that a temperature rise of said portion will cause the thermostatic power element to expand and open said valve.

3. In combination, a refrigeration system having a condenser, a water pipe for spraying said condenser to cool said condenser, a valve mounted in cooperation with said water pipe for controlling the flow of the water through the water pipe, said valve comprising a valve body having inlet and outlet chambers connected in said water pipe, a valve port disposed within said valve body and communicating with said inlet and outlet chambers, a valve member adapted to open and close said port, biasing means mounted to said valve body for biasing said valve member to close said port, a housing mounted in thermal contact with said condenser, a thermostatic power element mounted within said housing in a heat exchange relationship therewith, a thermal insulator, said valve body rigidly mounted to said thermal insulator, said thermal insulator rigidly mounted to said housing, whereby said valve body is thermally insulated from said housing so that the water within said inlet and outlet chambers is prevented from cooling said housing by thermal conduction therefrom, a valve lifter connected to said thermostatic power element and said valve member through said housing, said insulator, and said valve body, for causing said valve member to open said port against said biasing means responsive to the operation of said thermostatic power element, 4. In combination, a refrigeration system having a condenser, a water pipe for spraying said condenser to cool said condenser, said water pipe being exposed to water freezing temperatures, a valve mounted in cooperation with said water pipe for controlling the flow of the water through the water pipe, said valve comprising a valve body having inlet and outlet chambers connected in said water pipe, a substantial opening through said valve body communicating with said inlet chamber, a second substantial opening through said valve body communicating with said outlet chamber, first and second resilient plates, said first resilient plate mounted over said first substantial opening and secured at the outer marginal edges thereof to said valve body, said second resilient plate mounted over said second substantial opening and secured at the outer marginal edges thereof to said valve body, said first and second resilient plates flexing when the water within said inlet and outlet chambers freezes, thereby preventing said valve body from breaking, a valve port disposed within said valve body and communicating with said inlet and outlet chambers, a valve member adapted to open and close said port, biasing means mounted through said valve body over said second resilient plate and cooperating therewith for biasing said valve member to close said port, a housing mounted in thermal contact with said condenser, a thermostatic power element mounted within said housing in a heat exchange relationship therewith, a thermal insulator, the outer marginal edges of said first resilient plate and said valve body rigidly mounted to said thermal insulator, said thermal insulator rigidly mounted to said housing, whereby said valve body is thermally insulated from said housing so that the water within said inlet and outlet chambers is prevented from cooling said housing by thermal conduction therefrom; a valve lifter connected to said thermostatic power element and said valve member through said housing, said insulator, said first resilient plate, and said valve body, for causing said valve member to open said port against said biasing means responsive to the operation of said thermostatic power element.

WILLIAM F. BORGERD.

References Cited in the file of this patent

UNITED STATES PATENTS

| Number | Name | Date |
|---|---|---|
| Re. 21,503 | Alexander et al. | July 9, 1940 |
| 687,344 | Schmidt et al. | Nov. 26, 1901 |
| 985,147 | Culver | Feb. 28, 1911 |
| 1,362,757 | Stokes | Dec. 21, 1920 |
| 1,860,447 | Bergdoll | May 31, 1932 |
| 1,907,603 | Steenstrup | May 9, 1933 |
| 2,462,217 | Oaks | Feb. 22, 1949 |
| 2,466,460 | Marshall | Apr. 5, 1949 |
| 2,487,852 | Cook | Nov. 15, 1949 |
| 2,507,911 | Keller | May 16, 1950 |